United States Patent [19]

Pehlah et al.

[11] Patent Number: 5,047,490

[45] Date of Patent: Sep. 10, 1991

[54] HIGH MOLECULAR WEIGHT COPOLYMERS OF MALEIC ANHYDRIDE AND METHYL VINYL ETHER

[75] Inventors: Zvi Pehlah, Savyion, Israel; Istvan Potencsik, Mannheim, Fed. Rep. of Germany; Werner Kopp, Harthausen, Fed. Rep. of Germany; Ernst Urmann, Ludwigshafen, Fed. Rep. of Germany

[73] Assignee: Giulini Chemie GmbH, Ludwigshafen, Fed. Rep. of Germany

[21] Appl. No.: 382,064

[22] Filed: Jul. 14, 1989

Related U.S. Application Data

[63] Continuation of Ser. No. 180,079, Apr. 11, 1988, abandoned.

[30] Foreign Application Priority Data

Apr. 10, 1987 [DE] Fed. Rep. of Germany ....... 3712265

[51] Int. Cl.$^5$ .............................................. C08F 34/02
[52] U.S. Cl. .................................................... 526/271
[58] Field of Search ........................................ 526/271

[56] References Cited

U.S. PATENT DOCUMENTS

| | | | |
|---|---|---|---|
| 2,782,182 | 2/1957 | Verburg | 260/78.5 |
| 3,532,771 | 10/1970 | Field et al. | 260/875 |
| 3,553,183 | 1/1971 | Field et al. | 260/78.5 |
| 3,632,561 | 1/1972 | Gibb | 260/78.5 BB |
| 4,370,454 | 1/1983 | Messmer et al. | 526/271 |

FOREIGN PATENT DOCUMENTS

| | | |
|---|---|---|
| 59446 | 9/1982 | European Pat. Off. . |
| 68847 | 1/1983 | European Pat. Off. . |
| 1299119 | 3/1970 | Fed. Rep. of Germany . |
| 3042471 | 6/1982 | Fed. Rep. of Germany . |
| DE3514367 | 10/1986 | Fed. Rep. of Germany . |

Primary Examiner—Joseph L. Schofer
Assistant Examiner—Alex H. Walker
Attorney, Agent, or Firm—Spencer & Frank

[57] ABSTRACT

A process of manufacturing powdered copolymers of maleic anhydride with methyl vinyl ether in a mole ratio of 1:1 and a specific viscosity in a range from 2 to 5 by copolymerization of maleic anhydride with methyl vinyl ether in the presence of radical initiators to initiate polymerization. The process includes mixing maleic anhydride with an excess of about 3 to about 20 mol methyl vinyl ether per mol maleic anhydride and initiating a polymerization reaction with a radical initiator added in a quantity of from about 0.001 to about 1 weight % with respect to the maleic anhydride. The polymerization reaction takes place in the absence of other solvents.

10 Claims, No Drawings

HIGH MOLECULAR WEIGHT COPOLYMERS OF MALEIC ANHYDRIDE AND METHYL VINYL ETHER

This application is a continuation of application Ser. No. 07/180,079, filed Apr. 11, 1988, now abandoned.

FIELD OF THE INVENTION

The present invention relates to a process of manufacturing a powdery, high molecular weight copolymer of maleic anhydride and methyl vinyl ether. The copolymer according to the novel process is practically free of monomers and solvents and therefore especially suitable for use in the food, medical and cosmetics industries.

TECHNOLOGY REVIEW

It is known to produce copolymers of maleic anhydride and alkyl vinyl ethers by precipitation polymerization. The monomers are reacted in organic solvents in which the resulting polymers are insoluble, e.g. in aliphatic or aromatic hydrocarbons.

U.S. Pat. No. 2,782,182 discloses the copolymerization of maleic anhydride and methyl vinyl ether in benzene as a solvent. In this process, organic peroxide compounds are used as polymerization initiators which may be present in the reaction mixture at up to 0.125 weight percent with respect to the monomers. The quantity of polymerization initiator is disclosed to be reducible by adding a small quantity of maleic anhydride methyl vinyl ether copolymer. This also increases the reaction speed and the molecular weight of the product.

The production of high molecular weight copolymers of maleic anhydride and alkyl vinyl ethers is the object of British Patent No. 1,117,515 corresponding to U.S. Pat. No. 3,632,561. The significant feature of this invention is the copolymerization of the above-mentioned monomers in methylene chloride as solvent. The quantity of methylene chloride should here be about twice as large as the quantity of maleic anhydride employed. Suitable copolymers are disclosed to be obtained with maleic anhydride concentrations of 6 to 10 weight % with respect to the total starting quantity employed.

One drawback in prior art processes is that the copolymers clump together if greater maleic anhydride concentrations are employed. Such products are difficult to handle and are therefore undesirable in practice. The elimination of this drawback has already been the object of numerous patents, for example, U.S. Pat. No. 3,532,771 and DE-OS 2,014,242 corresponding to U.S. Pat. No. 3,553,183. U.S. Pat. No. 3,532,771 proposes to perform the copolymerization in the presence of so-called anti-clumping agents. The following anti-clumping agents are mentioned: copolymers of maleic anhydride including higher ($C_{10}$–$C_{16}$) or lower alkyl vinyl ethers, e.g. polymethyl vinyl ether. Benzene is used as the solvent in all cases.

German Patent No. 1,299,119 additionally proposes polystyrene, copolymers of styrene with methacrylic acid, acrylic acid and maleic acid ethers, polymers of acrylic acid esters, vinyl esters, vinyl ethers and soluble cellulose derivatives as anti-clumping agents.

These processes as well operate with the use of organic solvents, particularly aromatic hydrocarbons, such as benzene and toluene. This is disclosed as producing finely particulate polymer suspensions. However, additional process steps are required to isolate the powdered copolymers, particularly if the complete removal of the aromatic hydrocarbons, such as benzene and toluene, from the copolymer is desired.

DE-OS 3,108,100 corresponding to U.S. Pat. No. 4,370,454, finally, discloses the polymerization of maleic anhydride with alkyl vinyl ethers in a powder bed. Suitable powders are inorganic as well as organic materials. A moving powder bed is used for the polymerization to ensure that the copolymer product is in powdered form. However, the resulting copolymer still contains a large percentage of monomers which must be converted in a subsequent polymerization.

SUMMARY OF THE INVENTION

It is now an object of the present invention to provide a process for the manufacture of high molecular weight copolymers of maleic anhydride with methyl vinyl ether which operates without the use of organic solvents and without the use of other auxiliary substances and does not exhibit the above-described drawbacks.

Surprisingly, this is accomplished in that the copolymerization of the maleic anhydride is performed in an excess of methyl vinyl ether, with the excess being 3 to 20, preferably 6 to 15 mol methyl vinyl ether per mol maleic anhydride and the quantity of polymerization initiator is 0.001 to 1 weight %, preferably 0.01 to 0.5 weight %, with respect to the maleic anhydride. The polymerization is accomplished between 20° and 100° C., preferably, however, between 40° and 80° C.

The process is not only easily implemented, but it also results in a reaction product which is practically free of monomers and solvents. Moreover, it is available in the desired powder form. It was surprising and not predictable that such a result could be obtained without the use of the auxiliary agents used in the prior art, e.g. anti-clumping agents, cross-linking agents, solvents, a powder bed and others. In this connection it should also be mentioned that in the novel process high molecular weight copolymers are almost exclusively produced. Such copolymers are particularly suitable for use in the medical and cosmetic art as well as in the food processing art since they are practically free of monomers and solvents.

The molecular weight of the copolymer is defined by its specific viscosity. The specific viscosity is determined in that 0.5 g copolymer are dissolved in 50 ml methyl ethyl ketone and the specific viscosity is measured at 25° C.

This determination is made with a Cannon Fenske viscosimeter, capillary No. 100.

Compounds which decompose into radicals under polymerization conditions are suitable as polymerization initiators. Such compounds are, for example, organic peroxides, such as dibenzoyl peroxide or dilauroyl peroxide; azo compounds, such as azobisisobutyronitrile; and peroxydicarbonates, such as bis(4-t-butylcyclohexyl) peroxydicarbonate. The initiators are used in quantities of about 0.001 to 1 weight %, preferably 0.01 to 0.5 weight %, with respect to the maleic anhydride. Mixtures of various polymerization initiators having different decomposition temperatures can also be used.

The polymerization temperature may fluctuate over a wide range. It lies between 20° and 100° C., preferably between 40° and 80° C. The maximum possible reaction temperature is given by the softening point of the copolymer. Advantageously, the process is implemented at a pressure resulting from the vapor pressure of the methyl vinyl ether at the respective temperature. Additionally present insert gas may, however, increase the total pressure in the reactor. Pressures higher than 50 bar are not used in practice. The polymerization can be effected within a time span of 1 to 20 hours. Times from 3 to 8 hours have yielded particularly good results.

Boilers, stir autoclaves, horizontal mixers heated or cooled, for example, by way of a double jacket and other reactors can be used as polymerization reactor.

The process according to the invention is implemented in the simplest manner in that the maleic anhydride and the polymerization initiator are dissolved or dispersed in methyl vinyl ether and introduced into the reaction vessel. While the liquid is mixed intensively, the temperature is raised to the decomposition range of the polymerization initiator and the reaction suddenly begins. The reaction heat is removed by cooling and a defined temperature is maintained in the reaction chamber. After reaction of all of the maleic anhydride, the excess methyl vinyl ether is evaporated. A finely powdered copolymer remains as residue which is practically free of monomers. The removal of the methyl vinyl ether from the polymer suspension can of course also be effected by other methods, such as, for example, filtration. The dry product which is free of methyl vinyl ether is always obtained as a powdery copolymer which does not tend to clump.

DETAILED DESCRIPTION OF THE INVENTION

The examples below will serve to describe the invention in even greater detail.

EXAMPLE 1

A steel autoclave having a capacity of 750 mL and designed for a pressure of 200 bar served as polymerization reactor. It was equipped with a Teflon stirrer driven by way of a magnetic coupling and with a descending cooling element. A vacuum terminal and a nitrogen conduit open into the autoclave to permit the reaction to take place under the exclusion of air. The polymerization vessel was heated by way of a water bath. The starting mixture was composed of 30 g maleic anhydride and 0.03 g dilauroyl peroxide and the autoclave was closed and evacuated. While the system was being cooled, 350 mL methyl vinyl ether were condensed in and, after closing, were heated to 60° C. under stirring in a water bath within half an hour. After an hour, the temperature was increased to 65° C. and after another hour to 70° C. whereupon it was kept constant for three hours. Then, the methyl vinyl ether was distilled off and, after opening the autoclave, 48 g (99.4% of the theoretical value) of a finely powdered, colorless product were obtained at a specific viscosity of 3.55.

EXAMPLE 2

In the same apparatus as in Example 1, the following components were added: 70 g maleic anhydride, 0.014 g dibenzoyl peroxide in 350 mL methyl vinyl ether. Over a period of five hours, the reaction temperature was gradually increased from 60° C. to 75° C. Then the methyl vinyl ether was distilled off and, after opening the autoclave, a finely powdered, colorless product was obtained which had a specific viscosity of 4.3. As in Example 1, the yield corresponded to the theoretical value of a 1:1 copolymerization.

EXAMPLE 3

The following components were added in measured quantities into the same apparatus as in Examples 1 and 2: 30 g maleic anhydride, 0.12 g bis(4-t-butylcyclohexyl) peroxydicarbonate (BCHPC) in 350 mL methyl vinyl ether. Within five hours, the temperature was raised uniformly from 35° C. to 45° C. After distilling off the methyl vinyl ether, a finely powdered product was obtained which had a specific viscosity of 2.1.

EXAMPLE 4

The following components were added in measured quantities into the same apparatus as in Example 1: 30 g maleic anhydride, 0.03 g bis(4-t-butylcyclohexyl) peroxydicarbonate (BCHPC), and 0.005 g dilauroyl peroxide in 350 mL methyl vinyl ether. Over a period of four hours, the temperature was raised uniformly from 35° C. to 50° C. After distilling off the methyl vinyl ether, a finely powdered product was obtained which had a specific viscosity of 2.1.

EXAMPLE 5

A 26 liter steel autoclave equipped with a helical stirrer and a heatable double jacket was filled with 3 kg maleic anhydride and 4 g dilauroyl peroxide and the reactor was closed and evacuated.

Then, 15 L methyl vinyl ether were added and slightly heated until all of the maleic anhydride was dissolved. The temperature was raised to about 50° C. and, once the reaction started, a temperature of 55° to 65° C. was maintained in the reaction vessel by suitable cooling. After 4 to 5 hours, the reaction was completed, as determined by the fact that no monomeric maleic anhydride could be detected by means of triphenylphosphine paper. The excess methyl vinyl ether was distilled off. The process yielded 4.8 kg of a colorless, finely powdered 1:1 maleic anhydride-methyl vinyl ether copolymer having a specific viscosity of 3.1.

The present disclosure relates to the subject matter disclosed in Federal Republic of Germany Application No. P 37 12 265.7 on Apr. 10th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A process of manufacturing powdered copolymers of maleic anhydride and methyl vinyl ether in a single reaction vessel, essentially consisting of the steps of:
   preparing a reaction mixture by mixing maleic anhydride with an excess of methyl vinyl ether, said excess being in a range from about 3 to about 20 mol methyl vinyl ether per mol maleic anhydride and adding a radical initiator in a quantity of from about 0.001 to about 1 weight % with respect to the maleic anhydride;
   initiating a polymerization reaction by heating said reaction mixture in said reaction vessel to a decomposition temperature of the radical initiator, initiating said polymerization reaction at said decomposition temperature in the reaction vessel with intensive stirring and in the absence of other solvents;
   heating said reaction mixture in said reaction vessel to a reaction temperature at least 5° C. higher than said decomposition temperature to complete said polymerization reaction and maintaining said reaction temperature by external cooling;

evaporating excess methyl vinyl ether after reaction of maleic anhydride; and collecting a powdered copolymer of maleic anhydride and methyl vinyl ether, said copolymer having a mole ratio of maleic anhydride:methyl vinyl ether of about 1:1 and having a specific viscosity in a range from about 2 to about 5.

2. A process as defined in claim 1, wherein the quantity of radical initiator is in a range from about 0.01 weight % to about 0.5 weight % with respect to the maleic anhydride.

3. A process as defined in claim 1, wherein the excess of methyl vinyl ether is in a range from about 6 to about 15 mol methyl vinyl ether per mol maleic anhydride.

4. A process as defined in claim 1, wherein said polymerization reaction takes place at a temperature in a range from about 40° to about 80° C.

5. A process as defined in claim 1 wherein the reaction takes place at a pressure corresponding to the vapor pressure of the reaction mixture developing at the corresponding temperature.

6. A process as defined in claim 1, wherein the polymerization is performed in an inert gas atmosphere and the total pressure during the process is a maximum of 50 bar.

7. A process as defined in claim 1, wherein the polymerization is performed over a time period from 1 to 20 hours.

8. A process as defined in claim 1, wherein the polymerization is performed over a time period from 3 to 8 hours.

9. A powdered copolymer of maleic anhydride and methyl vinyl ether made by the process of claim 1.

10. A process as defined in claim 1, wherein in the initiating step said reaction vessel is a closed reaction vessel.

* * * * *